United States Patent [19]

Heine et al.

[11] Patent Number: 4,641,864
[45] Date of Patent: Feb. 10, 1987

[54] WEAR RESISTANT PIPE BEND FOR SLURRY TRANSPORT

[75] Inventors: Otto R. Heine, Poway; Peter M. Riede, La Jolla, both of Calif.

[73] Assignee: R & H Technologies, Inc., Minneapolis, Minn.

[21] Appl. No.: 580,873

[22] Filed: Feb. 16, 1984

[51] Int. Cl.$^4$ .................. F16L 43/00; B65G 53/54
[52] U.S. Cl. .................. 285/179; 285/923; 406/193
[58] Field of Search .......... 285/179, 15, 16, 17, 285/923; 406/193

[56] References Cited

U.S. PATENT DOCUMENTS

| | | | |
|---|---|---|---|
| 898,882 | 9/1908 | Hawkins | 285/179 |
| 1,064,343 | 6/1913 | Kennedy | 285/179 |
| 1,211,784 | 1/1917 | Stuart . | |
| 1,518,705 | 1/1923 | Raun . | |
| 2,350,759 | 6/1944 | Hilmer et al. . | |
| 3,578,075 | 5/1971 | Winter . | |
| 3,794,359 | 2/1974 | Fisher . | |
| 4,117,201 | 9/1978 | Keifert . | |
| 4,130,300 | 12/1978 | Sheridan . | |
| 4,251,170 | 2/1981 | Sheridan . | |
| 4,479,743 | 10/1984 | Stahl | 406/193 |

FOREIGN PATENT DOCUMENTS 2625018 12/1977 Fed. Rep. of Germany ...... 406/193

Primary Examiner—Cornelius J. Husar
Assistant Examiner—Anthony Knight
Attorney, Agent, or Firm—Klein & Szekeres

[57] ABSTRACT

An abrasion resistant pipe bend or elbow for slurry pipelines is disclosed. The bend or elbow has a wall of enlarged thickness disposed in the exterior of the turn of the fluid flow, in the area where impingement of the interior wall of the elbow by solid particulate material is most likely to occur. The wall of enlarged thickness includes a plurality of spaced protrusions which form a plurality of indentations or pockets. Openings of the pockets are disposed in substantial alignment with the instantaneous trajectory of solid particulates transported in the slurry. The pockets become filled with captured solid particles when slurry is transported through the elbow. The particles act as a shield or buffer against further bombardment of the wall of the elbow by the particles. Leading edges of the protrusions optionally have a cladding of an abrasion resistant material, such as a hardfacing composition, and are disposed to have a favorable, usually large, impact angle with the solid particles.

4 Claims, 4 Drawing Figures

WEAR RESISTANT PIPE BEND FOR SLURRY TRANSPORT

BACKGROUND OF THE INVENTION

1. Field of the Invention

The present invention is directed to a pipe bend or elbow to be used in slurry pipelines. More particularly, the present invention is directed to a pipe bend or elbow which is highly resistant to abrasion by solid particulate material transported in slurry pipelines and the like.

2. Brief Description of the Prior Art

Slurry transporting pipelines or conduits have been used in the mining, energy, chemical and related industries for a long time. Such pipelines or conduits, often incorporate pipe bends or elbows, which are necessary to join straight pipe sections to one another at various angles.

Pipe bends or elbows, however, present special wear and abrasion problems precisely because they change the direction of the flow in the slurry pipeline. As is well known, when a moving fluid carrying suspended solid particles, is forced to turn in a pipe bend or elbow, the direction of the fluid flow is changed more readily than the direction of movement of the suspended solid particles.

Thus, whereas the fluid turns readily and follows the curve or bend, the suspended solid particulates, by virtue of their much greater inertia, tend to continue to travel on their original straight line trajectory. Therefore, the solid particulates tend to impinge on the wall of the pipe bend or elbow in the exterior of the turn to which the slurry flow is subjected in the elbow. The continuous impingement of the elbows of a slurry pipeline causes abrasion, and increased corrosion so that the elbows require frequent replacement or repair.

In an effort to overcome the above-noted problem, the prior art has devised certain improved bends or elbows for slurry transporting pipes and pipelines which have increased resistance to abrasion. U.S. Pat. Nos. 4,130,300; 1,518,705; 1,211,784; 2,350,759; and 3,794,359; 4,117,201; and 4,251,170 disclose such pipe bends or elbows of improved wear and abrasion resistance.

A common feature of the prior art pipe bends of improved-wear and abrasion resistance, as exemplified in the above-noted patents, is that a wear resistant liner is incorporated into the wear-prone area of the bend or elbow. The devices disclosed in the above-noted patents differ from one another principally in the material of the liners, and in the manner of affixing the liners to the pipe bend or elbow.

U.S. Pat. No. 2,350,759 discloses a still different type of pipe bend or elbow of improved wear resistance. In this device, a resinous material is introduced into the interior surface of the elbow in the area where impingement by solid particles is most likely. The solid particles are said in the patent to adhere to the resinous material and thereby form a self-renewing layer which protects the elbow from abrasion.

Disadvantages of the above-summarized prior art structures include the relatively high cost of incorporating a separate liner into the pipe bend or elbow. In addition, the wear and the abrasion resistance provided by the prior art structures is still, often less than desirable. The present invention provides a pipe bend or elbow of increased wear and abrasion resistance which overcomes many problems of the prior art, particularly the costs associated with assembling liners into the pipe bends.

SUMMARY OF THE INVENTION

It is an object of the present invention to provide a wear and abrasion resistant pipe bend or elbow for slurry transporting pipes, pipelines and the like, which is relatively inexpensive to manufacture.

It is another object of the present invention to provide a pipe bend or elbow for slurry transporting pipes and pipe lines which has improved wear and abrasion resistance.

These and other objects and advantages are attained by a pipe bend or elbow which has a plurality of spaced protrusions in its interior in the area subjected to substantial impingement by solid particulate material flowing in the slurry.

The spaced protrusions are configured to form a plurality of indentations or pockets with openings directed towards the trajectory of the particles so that solid particles enter into the pockets and are captured therein. The captured particles then form a self-renewing protective layer on the wall of the pipe bend.

Optionally, leading edges of the protrusions which are exposed to impingement by the particles have a cladding of a hardfacing composition or the like, to increase their resistance to wear and abrasion. The leading edges are also configured to be impacted by the impinging solid particles in a predetermined range of impact angles, so as to minimize their abrasion and wear.

The features of the present invention can be best understood, together with further object and advantages, by reference to the following description taken together with the accompanying drawings.

DESCRIPTION OF THE PREFERRED EMBODIMENT

Figure 1:
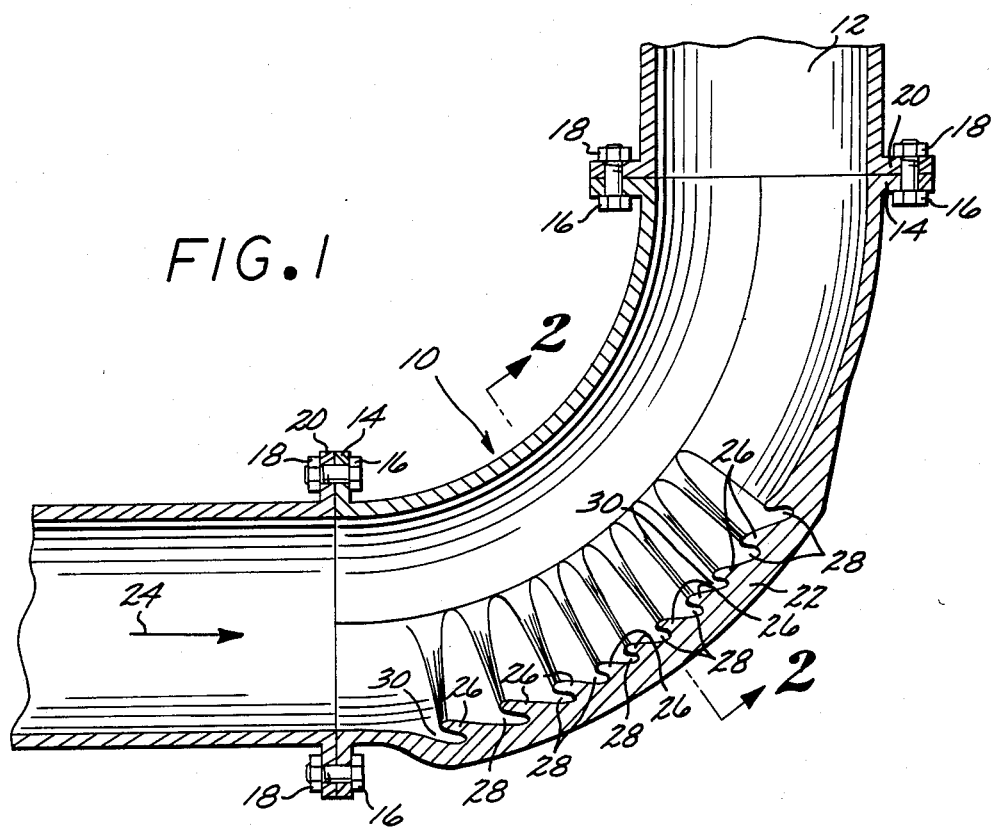
FIG. 1 is a cross-sectional view of a preferred embodiment of the present invention.
Figure 2:
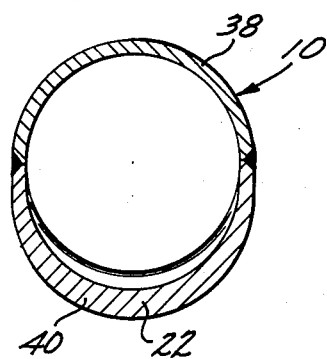
FIG. 2 is another cross-sectional view of the preferred embodiment, the cross-section being taken on lines 2,2 of FIG. 1.

The following specification taken in conjunction with the drawings sets forth the preferred embodiments of the present invention. The embodiments of the invention disclosed herein are the best modes contemplated by the inventors for carrying out their invention in a commercial environment, although it should be understood that various modifications can be accomplished within the parameters of the present invention.

Referring now to the drawing Figures, a preferred embodiment of the wear resistant pipe bend or elbow 10 of the present invention is disclosed. The pipe bend or elbow 10 is designed to function in the environment described in the introductory section of the present application for patent. Thus, the pipe bend or elbow 10 is designed to be used in pipelines 12 and conduits which transport solid particulate matter suspended in a fluid medium, usually a liquid.

The pipe bend or elbow 10 of the present invention usually and preferably has the same internal diameter as the pipeline 12 to which it is coupled. Because most slurry transporting pipelines have an internal diameter of at least approximately 6 inches, the pipe bend or elbow 10 of the present invention also has an internal diameter of at least approximately 6 inches. Many pipelines have an internal diameter of 12 inches, or more. Accordingly the internal diameter of the pipe bend or elbow 10 of the present invention can also be 12 inches or more.

The pipe bend or elbow 10 may be coupled to the pipeline 12 in conventional manner, such as for example by the flanges 14 shown on FIG. 1. As the Figure indicates, bolts 16 and nuts 18 attach the flanges 14 of the pipe bend 10 to corresponding flanges 20 of the pipeline 12.

The pipe bend or elbow 10 may be configured to provide a 90° change of direction or "turn" in the pipeline 12, as shown on FIG. 1. Nevertheless, pipe bends or elbows 10 of different "turn" angles (not shown) may also be constructed in accordance with the present invention. Moreover, the pipe bend or elbow 10 of the present invention, as other conventional pipe bends or elbows (not shown), preferably has a "circular bend", that is, the longitudinal center line of the bend is a segment of a circle of a radius which is usually 3 to 4 times the diameter of the pipe bend 10. In this regard it is noted that the smaller is the radius of the turning circle, the sharper is the turn, and therefore the greater is the wear and abrasion caused in the interior of the pipe bend 10 by the solid particulate matter which is transported within.

Figure 3:
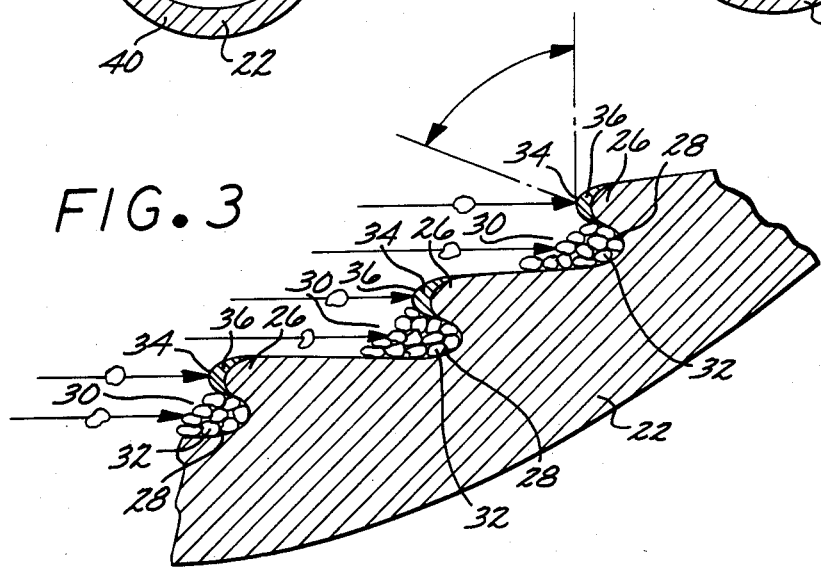
FIG. 3 is an enlarged, cross-sectional and partial view of protrusions and pockets incorporated into the preferred embodiment of the present invention.

In the area in the interior of the pipe bend 10 wherein the particulate material is most likely to impinge upon the pipe bend 10, the pipe bend or elbow 10 of the present invention has a wall 22 of substantially greater thickness on the exterior of the turn of the fluid flow than in the interior of the turn. Although, the liquid and the solid particulate material transported in the pipeline 12 are not shown on the drawing Figures, (except schematically on FIG. 3), the direction of the flow of the slurry is indicated on FIG. 1 by the arrow bearing the reference numeral 24.

Normal wall thickness of elbows 10 used in slurry pipelines is in the vicinity of approximately one (1) inch. This is the normal approximate wall thickness of the pipe bend 10 of the present invention as well. However, the wall 22 of the elbow 10 of the present invention, which is exposed to impingement by particles may be up to approximately three to four inches (3"–4") thick.

As an important novel feature of the present invention, a plurality of spaced protrusions 26 are incorporated in the wall 22 of enlarged thickness of the pipe bend 10. The spaced protrusions 26 form a plurality of pockets 28 having openings 30 towards the slurry flow. The openings 30 are disposed to be substantially aligned with the instantaneous direction of flow of the solid particulate material (not shown). As is known, by virtue of its inertia, the solid particulate material carried in the flow has a tendency to travel on a trajectory which is tangential to the turn of the flow. Therefore, the protrusions 26 and pockets 28 are disposed in the pipe bend 10 in such a manner that the openings 30 of the pockets 28 are substantially aligned with the tangent of the turn of the fluid flow.

As a result of the above-noted configuration, the pockets 28 capture a relatively large amount of solid particulate material (not shown) from the flow of the slurry (not shown), and become substantially filled with the captured solid particulate material. This is shown on the enlarged schematic view of FIG. 3, wherein the captured solid particulate material bears the reference numeral 32.

The captured solid particulate material 32 acts as a protective coating or buffer against further bombardment of the pipe bend 10 by solid particles (not shown) transported in the slurry (not shown). Typical depth of the pockets 28 is approximately $\frac{1}{4}$ to $\frac{1}{2}$ inches.

As it will be readily appreciated by those skilled in the art, the wall 22 of enlarged thickness would prolong the useful life of the pipe bend 10 even in the absence of the pockets 28. Moreover, the enlarged wall thickness facilitates the manufacture of the elbow 10 with the pockets 28.

Figure 4:
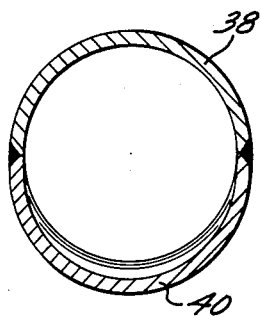
FIG. 4 is a cross-sectional view of another preferred embodiment, the cross-section being analogous to the cross-section taken on lines 2,2 of FIG. 1.

FIG. 4 shows in cross-section another preferred embodiment of the present invention, wherein the wall 22 is of approximately the same thickness as in the rest of the elbow 10, but where the pockets 28 are still present to protect the elbow 10 from abrasion.

Leading edges 34 of the spaced protrusions 26 of the pipe bend or elbow 10 of the present invention preferably comprise material which is more resistant to abrasion, than the rest of the pipe bend 10. The leading edges 34 of the protrusions 26 are defined for the purposes of the present invention as those edges or portions of the protrusions 26 which are most exposed to impingement by solid particles (not shown). Although providing the edges with an abrasion resistant material can be accomplished in various ways, in accordance with the present invention the leading edges 34 preferably include a cladding 36 of a suitable hardfacing composition such as STELLITE or HASTELLOY. The hardfacing composition can be applied to the leading edges 34 by techniques well known in the metallurgical arts, such as for example laser welding.

As a still additional novel feature of the present invention, the leading edges 34 are disposed in such a manner as to be impacted by the flow of solid particles (not shown) in a predetermined impact angle. As is well known in the engineering arts, the impact angle is defined as the angle between the direction of motion of the impacting particle and the tangent of the impacted article at the point of impact or range of impact angles. The predetermined range of impact angles is selected to be the range in which the impinging particles (not shown) cause the least abrasion. Experience with the flow of various slurries in transport pipelines (not shown) has demonstrated, that the least abrasive and therefore most favorable range of impact angles depends on the material and size of the solid particles. In many coal slurries of the type and density commonly transported in slurry pipelines (not shown) the most favorable impact angle is in the vicinity of 90°. In these slurries a relatively broad favorable impact angle range exists between approximately 60° to 90°. Even approximately 30° to 90° impact angles are acceptable.

The favorable nature of these impact angles is readily understood in light of the fact that abrasion by the moving particles (not shown) is due, to a large extent, to the sliding motion of the particles on the wall 22 of the pipe bend 10. Impact angles of approximately 30° to 90°, and preferably 60° to 90°, minimize the sliding motion, and therefore usually result in less abrasion than smaller impact angles, which tend to cause the particles to slide along the wall 22 of the elbow 10.

The pipe bend or elbow 10 of the present invention is advantageously made of two sections, schematically shown on FIG. 1. The two sections fit together substantially along the longitudinal center line of the elbow 20. Thus, the first section 38 is adapted to be disposed in the interior of the turn in the fluid flow, whereas the second section 40 is adapted to be disposed in the exterior of the turn of the fluid flow. The second section 40 contains the above-described wall 22 of enlarged thickness and the protrusions 26 and pockets 28.

In accordance with the present invention, the entire second section 40 may be made of a material which is more abrasion resistant than the material of the first section 38. However, in the above-described preferred embodiment, both sections 38 and 40 are made of the same material, and only the leading edges 34 of the spaced protrusions 26 contain the cladding 36 of a suitable hardfacing composition. As it will be readily appreciated by those skilled in the art, the construction of the above-described first preferred embodiment is particularly advantageous and economical, because highly abrasion resistant materials, such as hardfacing compositions, are expensive.

Thus, in accordance with the above-noted principles, both sections 38 and 40 of the pipe bend or elbow 10 can be cast from a suitable ferrous metal composition. Thereafter, the hardfacing composition is applied to the leading edges 34 as a cladding 36. The two sections 38 and 40 are then welded together to form the pipe bend or elbow 10 of the present invention. Instead of welding, the two sections 38 and 40 can also be joined to one another by other conventional means, such as flanges (not shown) and bolts (not shown) and nuts (not shown). However, when the two sections 38 and 40 of the pipe bend 10 are not joined to one another by welding, but by other conventional means such as bolts (not shown) and nuts (not shown), then a gasket (not shown) may also be required to prevent leakage.

Significant advantages of the pipe bend or elbow of the present invention include its relatively long life in spite of the abrasive power of solid particulate material transported in slurry pipelines (not shown). Another significant advantage of the pipe bend or elbow 10 of the present invention is the relative simplicity of its construction and therefore its relatively low cost. This is particularly true when the pipe bend 10 of the present invention is compared to prior art abrasion resistant pipe bends (not shown), which have elaborate in-built linings (not shown).

Various modifications of the abrasion resistant pipe bend or elbow 10 of the present invention may become readily apparent to those skilled in the art in light of the above disclosure. Therefore, the scope of the present invention should be interpreted solely from the following claims.

What is claimed is:

1. A pipe bend adapted to be joined to two sections of a slurry transporting pipe so as to form an elbow between said two pipe sections, the pipe bend comprisng a curved conduit including:
a plurality of spaced protrusions formed in the interior wall of the conduit in the area most exposed to impingement by solid particulate material moving as a slurry in the conduit, a plurality of pockets being formed between the spaced protrusions, the wall having the spaced protrusions being substantially thicker than the rest of the wall of the conduit, the spaced protrusions including a leading edge having maximum exposure to solid particulates moving in the slurry and having an outer cladding of a wear resistant material different from the material of the rest of the conduit, the pockets being adapted for capturing solid particles from flow of the slurry in the conduit, whereby particles captured in the pockets form a protective zone on the wall of the conduit to reduce wear and abrasion thereon.

2. The pipe bend of claim 1 wherein the cladding comprises a hardfacing composition.

3. A pipe elbow adapted for incorporation into a pipeline transporting a slurry comprising a liquid and solid particulate material carried by the liquid, the pipe elbow comprising:
a first section configured to be disposed in the interior of the turn which is caused in the flow of the slurry by the pipe elbow;
a second section configured to be disposed in the exterior of the turn which is caused in the flow of the slurry by the pipe elbow, the first and second sections being joined to one another in a substantially fluid tight manner;
a wall disposed in the second section of the elbow in an area subjected to substantial impingement by solid particulate material carried in the flow of the slurry, the wall being substantially thicker than walls of the first section, and
a plurality of spaced protrusions disposed in the wall of the second section which is subjected to substantial impingement, each of the protrusions including a leading edge comprising a cladding of a more wear resistant material than the material of the second section, the leading edges having maximal exposure to impingement by the solid particulate material carried in the flow of the slurry, the protrusions forming a plurality of indentations in the wall, with openings substantially aligned with the direction of flow of particulate material in the slurry, whereby during the flow of the slurry the indentations capture solid particulate material and become substantially filled with solid particulate material.

4. A pipe elbow adapted for incorporation into a pipeline transporting a slurry including a liquid, and solid particulate material carried by the liquid, the pipe elbow comprising:
a first section configured to be disposed in the interior of the turn which is caused in the flow of the slurry by the pipe elbow;
a second section configured to be disposed in the exterior of the turn which is caused in the flow of the slurry by the pipe elbow, the first and second sections being joined to one another in a substantially fluid tight manner substantially along a longitudinal section of the elbow;
a wall disposed in the second section of the elbow in the area subjected to substantial impingement by solid particulate material carried in the flow of the slurry, the wall being approximately 2 to 4 times thicker than walls of the first section, and
a plurality of spaced protrusions disposed in the wall of the second section which is subjected to substantial impingement, each of the protrusions having a leading edge comprising a cladding of a hardfacing composition and having maximal exposure to impingement by the solid particulate material carried in the flow of the slurry, the protrusions forming a plurality of indentations in the wall with openings substantially aligned with the direction of flow of particulate material in the slurry, whereby during flow of the slurry, the indentations capture solid particulate material and become substantially filled with solid particulate material.

* * * * *